United States Patent
Hsu et al.

(10) Patent No.: US 9,671,662 B2
(45) Date of Patent: Jun. 6, 2017

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventors: Je-hao Hsu, Shenzhen (CN); Jingfeng Xue, Shenzhen (CN); Juanning Dang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 726 days.

(21) Appl. No.: 14/234,377

(22) PCT Filed: Oct. 23, 2013

(86) PCT No.: PCT/CN2013/085772
§ 371 (c)(1),
(2) Date: Jan. 22, 2014

(87) PCT Pub. No.: WO2015/043033
PCT Pub. Date: Apr. 2, 2015

(65) Prior Publication Data
US 2016/0246102 A1   Aug. 25, 2016

(30) Foreign Application Priority Data
Sep. 25, 2013  (CN) .......................... 2013 1 0443322

(51) Int. Cl.
*G09G 5/00* (2006.01)
*G02F 1/1362* (2006.01)
(Continued)

(52) U.S. Cl.
CPC ........ *G02F 1/13624* (2013.01); *G02F 1/1343* (2013.01); *G02F 1/13306* (2013.01);
(Continued)

(58) Field of Classification Search
CPC ... G09G 2300/0426; G09G 2300/0238; G09G 2300/0809
See application file for complete search history.

(56) References Cited

U.S. PATENT DOCUMENTS

2010/0026921 A1* 2/2010 Tsubata ................ G09G 3/3648
349/37
2013/0285054 A1* 10/2013 Moriguchi .......... H01L 27/1225
257/43

FOREIGN PATENT DOCUMENTS

CN    102707527 A  *  3/2012  ............ G09G 3/36
CN    102707527 A     10/2012

* cited by examiner

*Primary Examiner* — William Boddie
*Assistant Examiner* — Leonid Shapiro
(74) *Attorney, Agent, or Firm* — Andrew C. Cheng (57) ABSTRACT

The present invention discloses an array substrate and liquid crystal display panel, wherein in the array substrate, each pixel unit includes a first pixel electrode, a second pixel electrode and a third pixel electrode; and each pixel unit includes a first control circuit and a second control circuit; the first control circuit affects first pixel electrode to make first pixel electrode in a state corresponding to displaying a black image in 3D display mode; the second control circuit affects second pixel electrode to change the voltage of second pixel electrode. As such, the present invention can reduce color difference at large viewing angle, improve opening ratio in 2D mode, reduce signal cross-talk in 3D mode, and reduce the number of data line drivers to reduce the cost.

15 Claims, 6 Drawing Sheets

(51) Int. Cl.
  *G02F 1/1343* (2006.01)
  *H04N 13/04* (2006.01)
  *G02F 1/133* (2006.01)
  *G09G 3/36* (2006.01)
(52) U.S. Cl.
  CPC .. *G02F 1/134309* (2013.01); *G02F 1/134336* (2013.01); *G02F 1/136286* (2013.01); *G09G 3/3648* (2013.01); *H04N 13/0434* (2013.01); *H04N 13/0452* (2013.01); *H04N 13/0454* (2013.01); *H04N 13/0497* (2013.01); *G02F 2001/134345* (2013.01); *G09G 2300/0426* (2013.01); *G09G 2300/0809* (2013.01); *G09G 2320/0214* (2013.01); *G09G 2320/0238* (2013.01)

ARRAY SUBSTRATE AND LIQUID CRYSTAL DISPLAY PANEL

BACKGROUND OF THE INVENTION

1. Field of the Invention

The present invention relates to the field of liquid crystal displaying techniques, and in particular to an array substrate and a liquid crystal display panel.

2. the Related Arts

A vertical alignment (VA) liquid crystal display (LCD) panel has the advantages of fast response, high contrast, and so on, and is the current mainstream in the market. However, at different viewing angles, the orientation of the liquid crystal molecules are different so that the effective refraction of the liquid crystal molecules are also different, which leads to variations of light penetration. Specifically, the light penetration capability is reduced at a slanted viewing angle, and the color viewed at slanted angle and the color viewed at right front are inconsistent, resulting in a color distortion at a large viewing angle. To improve the color distortion at large viewing angle, in pixel design, a pixel is divided into a main pixel area and a secondary pixel area. Each pixel area is divided into a four domains (referring to the small area with basically the same liquid crystal molecular orientation). Hence, each pixel is divided into 8 domains. Through making the voltages of the main pixel area and the secondary pixel area different, the liquid crystal molecular orientation of the two pixel areas are made different to improve the color distortion at large viewing angle to achieve low color shift (LCS).

In the three-dimensional (3D) film-type patterned retarder (FPR) displaying technique, two neighboring rows of pixels correspond to the left eye and right eye of a viewer to generate respective left-eye image and right-eye image. The left eye and the right eye of the viewer receive respectively the left-eye image and the right-eye image, and the brain synthesizes the two images so that the viewer feels the 3D displaying effect. However, as the left-eye image and the right-eye image may cause cross-talk to occur, which results in the viewer seeing a double-image. To avoid cross-talk, a black matrix (BM) technique to shield between two neighboring rows of pixels is used to prevent signal cross-talk and reduce the image cross-talk. Nevertheless, this technique will greatly reduce the opening ratio in the 2D display mode and reduce the display luminance in 2D display mode.

The aforementioned LCS design of dividing a pixel into a main pixel area and a secondary pixel area can solve the opening ratio problem in 2D display mode and the signal cross-talk problem in 3D display mode at the same time. That is, in 2D display mode, the technique can control the main pixel area and the secondary pixel area to display normal 2D image, while in 3D display mode, the main pixel area display a black image equivalent to BM to reduce the cross-talk between two eyes and the secondary pixel area display 3D image. However, in 3D display mode, because the main pixel area displays a black image, i.e., only the secondary pixel displays 3D image normally in 3D display mode, the LCS effect cannot be achieved, and color distortion is still observed at large viewing angle.

Figure 1:
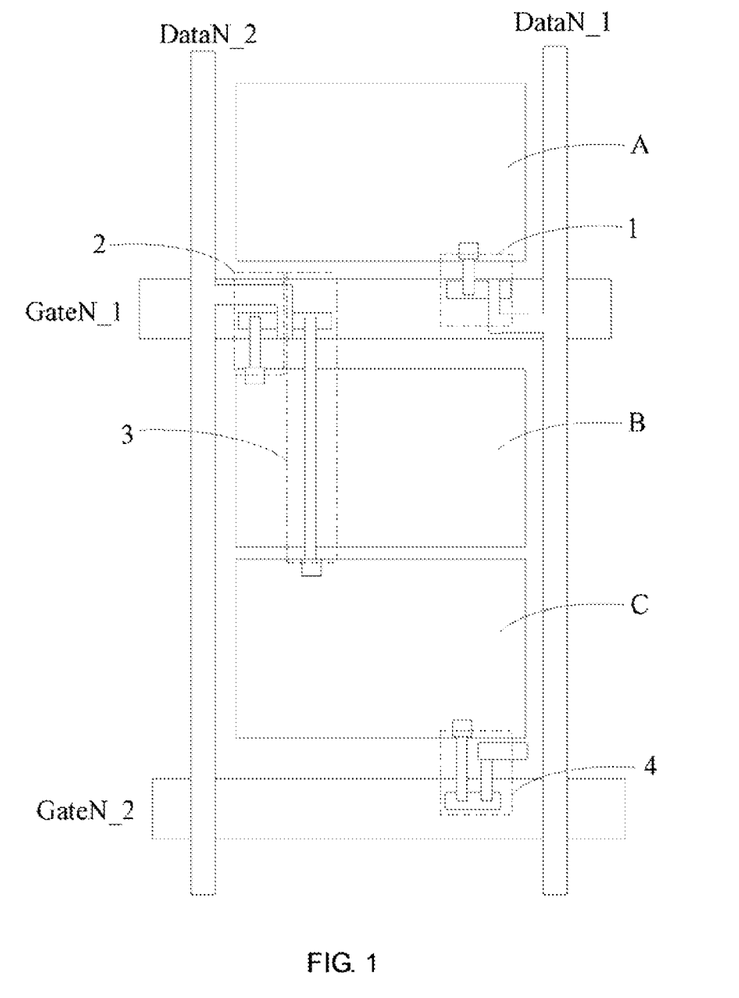
FIG. 1 is a schematic view showing the structure of a known array substrate.
Figure 2:
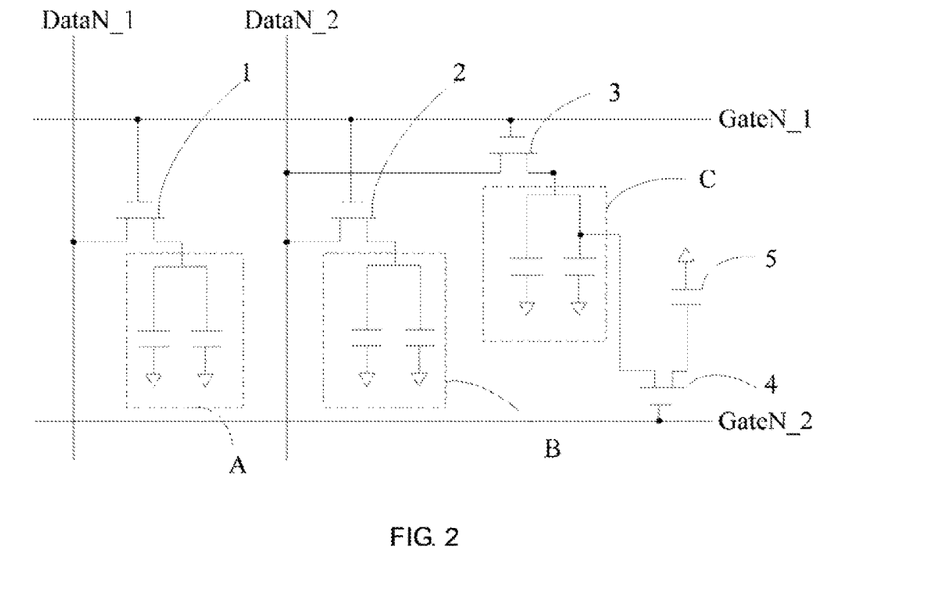
FIG. 2 is an equivalent circuit diagram of a pixel unit shown in FIG. 1.

To solve the aforementioned problems, the known technique in FIG. 1 and FIG. 2 divides a pixel into three sub-pixel areas A, B, C, with each sub-pixel area further divided into 4 domains. Each pixel is driven by two data lines and two scan lines. In 2D display mode, GateN_1 controls the thin-film transistor (TFT) 1, 2, 3 to become conductive, DataN_1 inputs respective data signal to sub-pixel A, DataN_2 inputs respective data signal to sub-pixel B and C so that the three sub-pixel areas A, B, C can all display 2D image normally to improve the opening ratio in 2D display mode. Different data signals are inputted through DataN_1 and DataN_2 to make the voltage of the sub-pixel area A differs from the voltage of sub-pixel areas B, C, and then GateN_2 makes the TFT 4 conductive. Under the effect of capacitor C1, the voltage of the sub-pixel area B is different from the voltage of the sub-pixel area C. As such, each of the three sub-pixel areas A, B, C has a different voltage to achieve the LCS effect in 2D display mode. In 3D display mode, GateN_1 controls the thin-film transistor (TFT) 1, 2, 3 to become conductive, DataN_1 inputs respective data signal to sub-pixel A to make sub-pixel A display a black image, DataN_2 inputs respective data signal to sub-pixel B and C so that the three sub-pixel areas A, B, C can all display 3D image normally so that a row in two neighboring rows of pixels, a row of pixels displays the sub-pixel area B and sub-pixel area C of the left-eye image and the other row displays the sub-pixel area A, which is able to display black image, between the sub-pixel area B and sub-pixel area C of the right-eye image. The displaying of sub-pixel area A of a black image is equivalent to the BM, and can reduce the 3D signal cross-talk between two eyes. Then, GateN_2 makes the TFT 4 conductive. Under the effect of capacitor C5, the voltage of the sub-pixel area B is different from the voltage of the sub-pixel area C so as to achieve the LCS effect in 3D display mode.

Through the above technique, the opening ratio problem in 2D display mode and the signal cross-talk between two eyes in 3D display mode can both be solved, as well as to achieve the LCS effect in both 2D and 3D display modes. However, in the above technique, two data lines are required to drive each pixel, which accordingly increases the number of data line drivers and manufacturing cost.

SUMMARY OF THE INVENTION

The technical issue to be addressed by the present invention is to provide an array substrate and liquid crystal display panel, able to reduce the color shift at a large viewing angle, increase the opening ratio in 2D display mode and reduce the signal cross-talk between two eyes in 3D display mode, as well as to reduce the number of data line drivers to enable cost reduction.

The present invention provides an array substrate, which comprises: a plurality of first scan lines, a plurality of second scan lines, a plurality of third scan lines, a plurality of data lines, a plurality of pixel units, arranged in matrix form, and a common electrode for inputting a common voltage; wherein the each pixel unit corresponding to a first scan line, a second scan line, a third scan line and a data line; each pixel unit further comprising a first pixel electrode, a second pixel electrode, a third pixel electrode, and a first switch, a second switch and a third switch controlling the first pixel electrode, the second pixel electrode and the third pixel electrode respectively; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal: the first control circuit being connected to the common electrode; the first control circuit affecting the first pixel electrode of the pixel unit when the second scan line corresponding to the pixel unit inputting a second scan signal so that a zero voltage difference existing between the first pixel electrode and the common electrode to make the first pixel electrode in a state corresponding to displaying a black image; the second circuit being connected to the common electrode; the second control circuit affecting the second pixel electrode of the pixel unit when the third scan line corresponding to the pixel unit inputting a third scan signal to change the voltage of the second pixel electrode; wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode.

According to a preferred embodiment of the present invention, the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

According to a preferred embodiment of the present invention, the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

According to a preferred embodiment of the present invention, the capacitor element is formed by a metal line forming the first scan line and a metal line forming the data line.

According to a preferred embodiment of the present invention, the second control circuit comprises a sixth switch, and the sixth switch comprises: a control terminal, a first terminal and a second terminal; the control terminal of the sixth switch is connected to the third scan line corresponding to the pixel unit, the first terminal of the sixth switch is connected to the second pixel electrode of the pixel unit, the second terminal of the sixth switch is connected to the common electrode; when the third scan line corresponding to the pixel unit inputs the third scan signal, the sixth switch is conductive; during the conductive period, the sixth switch changes the voltage of the second pixel electrode.

According to a preferred embodiment of the present invention, all of the second scan lines are electrically connected in the peripheral area of the array substrate.

The present invention provides an array substrate, which comprises: a plurality of first scan lines, a plurality of second scan lines, a plurality of third scan lines, a plurality of data lines, a plurality of pixel units, arranged in matrix form, and a common electrode for inputting a common voltage; wherein the each pixel unit corresponding to a first scan line, a second scan line, a third scan line and a data line; each pixel unit further comprising a first pixel electrode, a second pixel electrode, a third pixel electrode, and a first switch, a second switch and a third switch controlling the first pixel electrode, the second pixel electrode and the third pixel electrode respectively; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal: the first control circuit affecting the first pixel electrode of the pixel unit when the second scan line corresponding to the pixel unit inputting a second scan signal to make the first pixel electrode in a state corresponding to displaying a black image; the second control circuit affecting the second pixel electrode of the pixel unit when the third scan line corresponding to the pixel unit inputting a third scan signal to change the voltage of the second pixel electrode; wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode.

According to a preferred embodiment of the present invention, the first control circuit is connected to the common electrode; the first control circuit affects the first pixel electrode of the pixel unit when the second scan line corresponding to the pixel unit inputs a second scan signal so that a zero voltage difference exists between the first pixel electrode and the common electrode to make the first pixel electrode in a state corresponding to displaying a black image.

According to a preferred embodiment of the present invention, the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

According to a preferred embodiment of the present invention, the second circuit is connected to the common electrode; the second control circuit affects the second pixel electrode of the pixel unit when the third scan line corresponding to the pixel unit inputs a third scan signal to change the voltage of the second pixel electrode.

According to a preferred embodiment of the present invention, the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

According to a preferred embodiment of the present invention, the capacitor element is formed by a metal line forming the first scan line and a metal line forming the data line.

According to a preferred embodiment of the present invention, the second control circuit comprises a sixth switch, and the sixth switch comprises: a control terminal, a first terminal and a second terminal; the control terminal of the sixth switch is connected to the third scan line corresponding to the pixel unit, the first terminal of the sixth switch is connected to the second pixel electrode of the pixel unit, the second terminal of the sixth switch is connected to the common electrode; when the third scan line corresponding to the pixel unit inputs the third scan signal, the sixth switch is conductive; during the conductive period, the sixth switch changes the voltage of the second pixel electrode.

According to a preferred embodiment of the present invention, all of the second scan lines are electrically connected in the peripheral area of the array substrate.

The present invention provides a liquid crystal display panel, which comprises a plurality of first scan line drivers, at least a second scan line driver, a plurality of third scan line drivers, a plurality of data line drivers, an array substrate, a color filter substrate, and a liquid crystal layer sandwiched between the array substrate and the color filter substrate, wherein the array substrate comprising: a plurality of first scan lines, a plurality of second scan lines, a plurality of third scan lines, a plurality of data lines, a plurality of pixel units, arranged in matrix form, and a common electrode for inputting a common voltage; wherein the each pixel unit corresponding to a first scan line, a second scan line, a third scan line and a data line; each pixel unit further comprising a first pixel electrode, a second pixel electrode, a third pixel electrode, and a first switch, a second switch and a third switch controlling the first pixel electrode, the second pixel electrode and the third pixel electrode respectively; each first scan line driver being connected to a first scan line to input a first scan signal to the first scan line; each of the at least a second scan line driver being connected to all second scan lines to input a second scan signal and a fourth scan signal to the second scan lines; each third scan line driver being connected to a third scan line to input a third scan signal to the third scan line; and each data line driver being connected to a data line to input a data signal to the data line; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal; the first control circuit affecting the first pixel electrode of the pixel unit when the second scan line corresponding to the pixel unit inputting a second scan signal to make the first pixel electrode in a state corresponding to displaying a black image; the second control circuit affecting the second pixel electrode of the pixel unit when the third scan line corresponding to the pixel unit inputting a third scan signal to change the voltage of the second pixel electrode; wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode.

According to a preferred embodiment of the present invention, the first control circuit is connected to the common electrode; the first control circuit affects the first pixel electrode of the pixel unit when the second scan line corresponding to the pixel unit inputs a second scan signal so that a zero voltage difference exists between the first pixel electrode and the common electrode to make the first pixel electrode in a state corresponding to displaying a black image.

According to a preferred embodiment of the present invention, the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

According to a preferred embodiment of the present invention, the second circuit is connected to the common electrode; the second control circuit affects the second pixel electrode of the pixel unit when the third scan line corresponding to the pixel unit inputs a third scan signal to change the voltage of the second pixel electrode.

According to a preferred embodiment of the present invention, the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

According to a preferred embodiment of the present invention, all of the second scan lines are electrically connected in the peripheral area of the array substrate.

The efficacy of the present invention is that to be distinguished from the state of the art. In the array substrate of the present invention, each pixel unit uses a first scan line, a second scan line, a third scan line and a data line to drive. Compared to the known technique, the number of data lines is decreased so as to decrease the number of data line drivers to reduce the manufacturing cost. In addition, each pixel unit comprises a first control circuit and a second control circuit. The first control circuit affects the first pixel electrode when the second scan line corresponding to the pixel unit inputs a second scan signal to make the first pixel electrode in a state corresponding to displaying a black image; and the second control circuit affects the second pixel electrode when the third scan line corresponding to the pixel unit inputs a third scan signal to change the voltage of the second pixel electrode. In 2D display mode, the second scan line controls he first control circuit so that the first control circuit controls the first pixel electrode to be in a state corresponding to displaying a 2D image. In other words, the first pixel electrode, the second pixel electrode and the third pixel electrode are all in a state corresponding to displaying a 2D image so as to increase the opening ratio. The third scan line controls the second control circuit so that the second control circuit affects the second pixel electrode so that a non-zero voltage exists between the second pixel electrode and the first pixel electrode, and between the second pixel electrode and the third pixel electrode, respectively, resulting in reducing the color difference at large viewing angle in 2D display mode. In 3D display mode, the second scan line controls the first control circuit to affect the first pixel electrode so that the first pixel electrode is in a state corresponding to displaying a black image. Through the first pixel electrode in the state corresponding to displaying a black image, the erroneous left-eye image and the right-eye image can be blocked so as to reduce the signal cross-talk between two eyes in 3D mode. The third scan line controls the second control circuit so that the second control circuit affects the second pixel electrode so that a non-zero voltage difference exists between the second pixel electrode and the third pixel electrode, resulting in reducing the color difference at large viewing angle in 3D display mode.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers to the drawings and the embodiments to describe the present invention in details.

Figure 3:
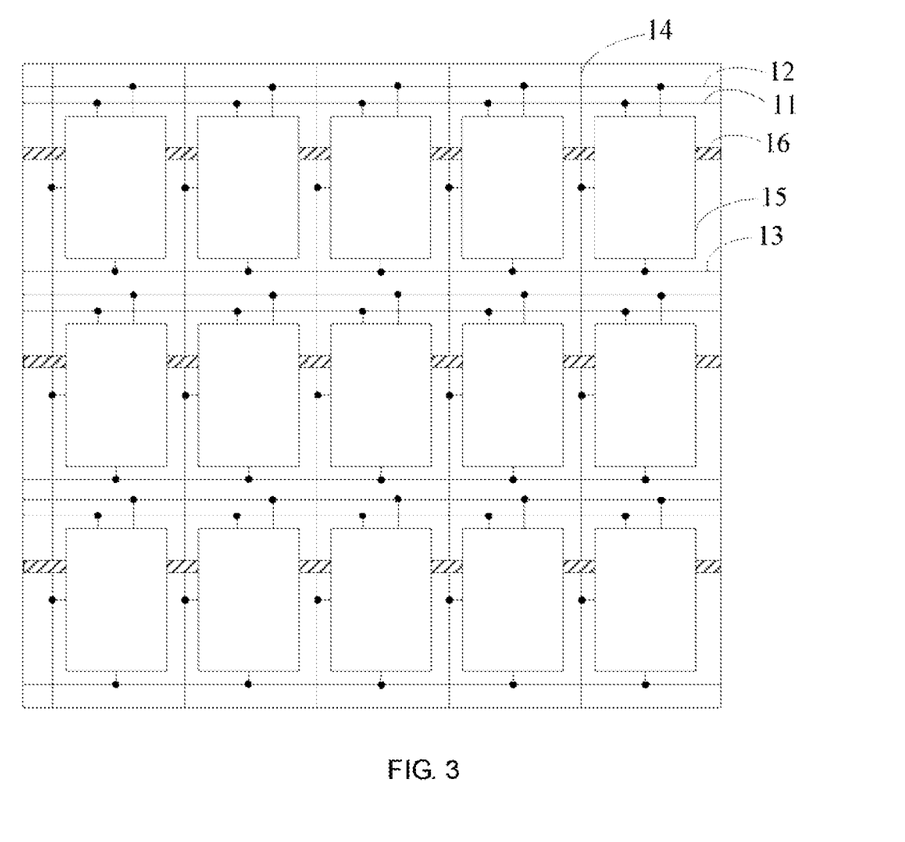
FIG. 3 is a schematic view showing an embodiment of the array substrate according to the present invention.
Figure 4:
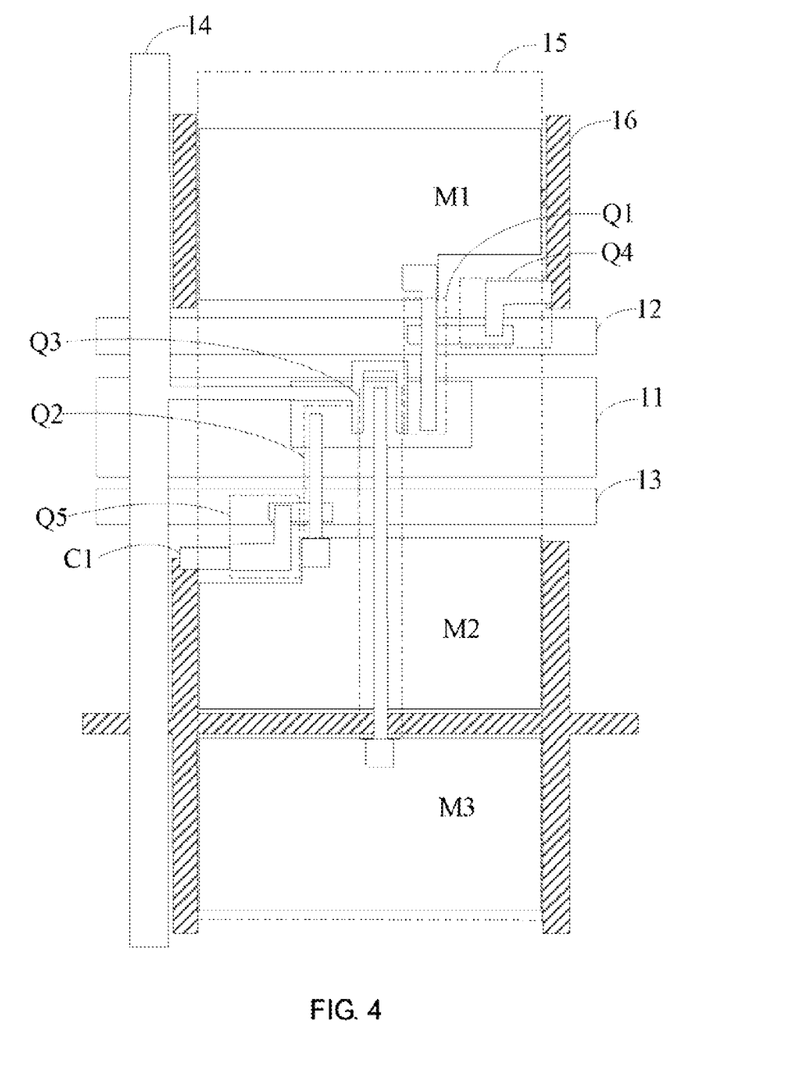
FIG. 4 is a schematic view showing the structure of an embodiment of pixel unit in the array substrate of FIG. 3.
Figure 5:
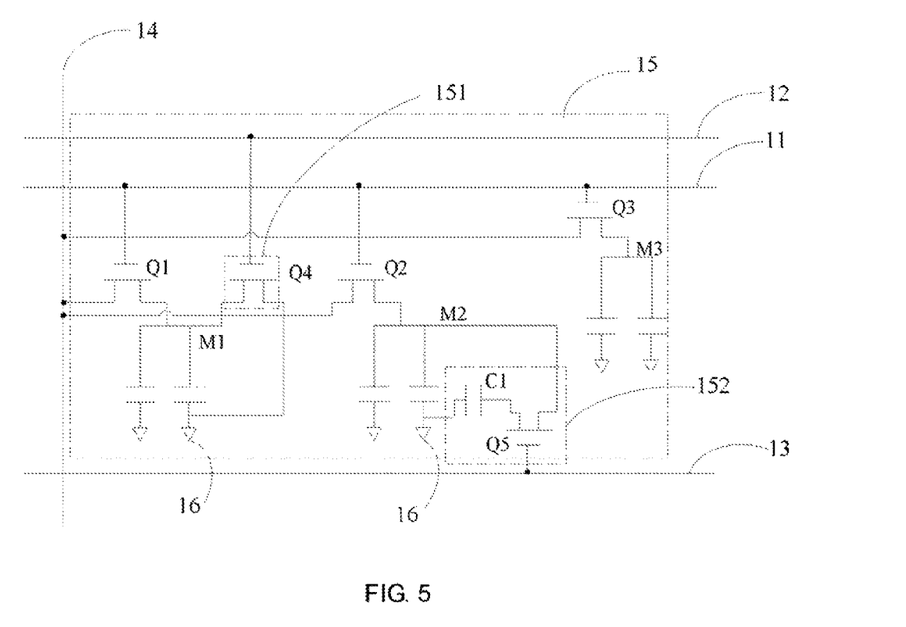
FIG. 5 is an equivalent circuit diagram of a pixel unit shown in FIG. 4.

Referring to FIGS. 3-5, in an embodiment of the array substrate of the present invention, the array substrate comprises: a plurality of first scan lines 11, a plurality of second scan lines 12, a plurality of third scan lines 13, a plurality of data lines 14, and a plurality of pixel units 15, arranged in matrix form. The array substrate further comprises a common electrode 16 for inputting a common voltage. Each of the plurality of pixel units corresponds to a first scan line 11, a second scan line 12, a third scan line 13 and a data line 14.

Referring to FIG. 5, each pixel unit 15 further comprises a first pixel electrode M1, a second pixel electrode M2, a third pixel electrode M3, and a first switch Q1, a second switch Q2 and a third switch Q3 controlling the first pixel electrode M1, the second pixel electrode M2 and the third pixel electrode M3 respectively. The control terminal of the first switch Q1, the control terminal of the second switch Q2 and the control terminal of the third switch Q3 are all electrically connected to the first scan line 11 corresponding to the pixel unit 15 for receiving a first scan signal. The input terminal of the first switch Q1, the input terminal of the second switch Q2 and the input terminal of the third switch Q3 are all electrically connected to the data line 14 corresponding to the pixel unit 15. The output terminal of the first switch Q1 is electrically connected to the first pixel electrode M1, the output terminal of the second switch Q2 is electrically connected to the second pixel electrode M2, and the output terminal of the third switch Q3 is electrically connected to the third pixel electrode M3. When inputting a first signal to the first scan line 11 corresponding to the pixel unit 15, the first switch Q1, the second switch Q2 and the third switch Q3 are conductive, and the data line 14 corresponding to the pixel unit 15 provides data signal to the first pixel electrode M1, the second pixel electrode M2 and the third pixel electrode M3 corresponding to the pixel unit 15 through the first switch Q1, the second switch Q2 and the third switch Q3 respectively, so as to drive the first pixel electrode M1, the second pixel electrode M2 and the third pixel electrode M3 to operate. In the instant embodiment, the first switch Q1, the second switch Q2 and the third switch Q3 are all thin-film transistor (TFT), and the control terminal corresponds to the gate of the TFT, the input terminal corresponds to the source of the TFT and the output terminal corresponds to the drain of the TFT. Of course, in other embodiments, the first switch Q1, the second switch Q2 and the third switch Q3 can be triode, Darlington transistor, and so on. No specific restriction is imposed.

Accordingly, all of the second scan lines 12 are electrically connected in the peripheral area of the array substrate (i.e., the area outside of the pixel area). Of course, in other embodiments, all of the second scan lines 12 are electrically connected in internal area of the array substrate (i.e., the pixel area). Alternatively, all of the second scan lines 12 can be mutually independent. No specific restriction is imposed.

In the liquid crystal displaying technique, the theory of a liquid crystal display panel to realize displaying is to make a certain voltage difference existing between the pixel electrodes of the array substrate and the common electrode of the color filter substrate so that the pixel electrodes can display corresponding image normally. When the voltage difference existing between the pixel electrodes of the array substrate and the common electrode of the color filter substrate becomes zero, the pixel electrodes display a corresponding black image. The common voltage applied to the common electrode of the color filter substrate and the common voltage applied to the common electrode of the array substrate are the same.

In the instant embodiment, the pixel unit further comprises a first control circuit 151 and a second control circuit 152. The second scan line 12 corresponding to the pixel unit 15 is electrically connected to the first control circuit 151 to control the first control circuit 151. The first control circuit 151 is electrically connected to the first pixel electrode M1 of the pixel unit 15 and the common electrode 16. The first control circuit 151 affects the first pixel electrode M1 of the pixel unit 15 when the second scan line 12 corresponding to the pixel unit 15 inputs a second scan signal so that a zero voltage difference exists between the first pixel electrode M1 and the common electrode 16 to make the first pixel electrode M1 in a state corresponding to displaying a black image. The third scan line 13 corresponding to the pixel unit 15 is electrically connected to the second control circuit 152 to control the second control circuit 152. The second control circuit 152 is electrically connected to the second pixel electrode M2 of the pixel unit 15 and the common electrode 16. The second control circuit 152 affects the second pixel electrode M2 of the pixel unit 15 when the third scan line 13 corresponding to the pixel unit 15 inputs a third scan signal to change the voltage of the second pixel electrode M2.

Specifically, the first control circuit 151 comprises a fourth switch Q4, and the fourth switch Q4 comprises: a control terminal, a first terminal and a second terminal. The control terminal of the fourth switch Q4 is electrically connected to the second scan line 12 corresponding to the pixel unit 15, the first terminal of the fourth switch Q4 is electrically connected to the first pixel electrode M1 of the pixel unit 15, and the second terminal of the fourth switch Q4 is electrically connected to the common electrode 16. When the second scan line 12 corresponding to the pixel unit 15 inputs the second scan signal, the fourth switch Q4 is conductive. During the conductive period, the fourth switch Q4 controls the first pixel electrode M1 of the pixel unit 15 to have a zero voltage difference with the common electrode 16 to make the first pixel electrode M1 in a state corresponding to displaying a black image. The second control circuit 152 comprises a fifth switch Q5 and a capacitor element C1, wherein the capacitor element C1 is formed by a metal line forming the first scan line 11 and a metal line forming the data line 14. The fifth switch Q5 comprises: a control terminal, a first terminal and a second terminal. The control terminal of the fifth switch Q5 is electrically connected to the third scan line 13 corresponding to the pixel unit 15, the first terminal of the fifth switch Q5 is electrically connected to the second pixel electrode M2 of the pixel unit 15, and the second terminal of the fifth switch Q5 is electrically connected to one end of the capacitor element C1 and the other end of the capacitor element C1 is electrically connected to the common electrode 16. When the fifth switch Q5 is non-conductive, the capacitor element C1 has a voltage the same as the voltage of the common electrode 16. When the third scan line 13 corresponding to the pixel unit 15 inputs the third scan signal, the fifth switch Q5 is conductive so that the second pixel electrode M2 of the pixel unit 15 and the capacitor element C1 are electrically connected; and the voltage of the second pixel electrode M2 changes through the capacitor element C1. In the instant embodiment, the fourth switch Q4 and the fifth switch Q5 are both thin-film transistor (TFT), and the control terminals of the fourth switch Q4 and the fifth switch Q5 correspond to the gates of the TFTs, the input terminals of the fourth switch Q4 and the fifth switch Q5 correspond to the sources of the TFTs and the output terminals of the fourth switch Q4 and the fifth switch Q5 correspond to the drains of the TFTs.

In other embodiments, the capacitor element C1 can be formed by the metal line forming the first scan line 11 and transparent conductive electrodes; the fourth switch Q4 and the fifth switch Q5 can be triode, Darlington transistor, and so on. No specific restriction is imposed.

Through the array substrate of the instant embodiment, the color difference at large viewing angle in 2D and 3D display modes can be reduced, as well as improve the opening ratio in 2D display mode and reduce signal crosstalk in 3D mode.

In 2D display mode, the common electrode 16 inputs a fixed voltage. When scanning the pixel unit 15, a first scan signal is inputted to the first scan line 11 corresponding to the pixel unit 15 to make the first switch Q1, the second switch Q2 and the third switch Q3 conductive. The data line 14 corresponding to the pixel unit 15 provides data signals to the first pixel electrode M1, the second pixel electrode M2 and the third pixel electrode M3 through the first switch Q1, the second switch Q2 and the third switch Q3 respectively so that the first pixel electrode M1, the second pixel electrode M2 and the third pixel electrode M3 are in a state corresponding to displaying a 2D image. In this display mode, the second scan line 12 inputs a low level (−2V~− 12V) fourth scan signal to make the fourth switch Q4 non-conductive, such as, inputting a −6V low level scan signal to make the fourth switch Q4 non-conductive in 2D display mode so that the first pixel electrode M1 is not connected to the common electrode 16, which results in the first pixel electrode M1 in a state corresponding to displaying a 20 image. In other words, in 2D display mode, the three pixel electrodes M1, M2 and M3 are all in a state corresponding to displaying a 2D image. As such, the opening ratio in 2D display mode is improved.

At this point, the first pixel electrode M1, the second pixel electrode M2 and the third pixel electrode M3 have the same voltage. Then, the first scan line 11 corresponding to the pixel unit 15 stops inputting the first scan signal so that the first switch Q1, the second switch Q2 and the third switch Q3 become non-conductive. The third scan line 13 corresponding to the pixel unit 15 inputs the third scan signal to make the fifth switch Q5 conductive so that the second pixel electrode M2 and the capacitor element C1 are electrically connected, wherein the third scan signal and the first scan signal can be the same scan signal. The voltage of the capacitor element C1 is the same as the voltage of the common electrode 16 before the fifth switch Q5 becomes conductive. Therefore, in the positive polarity (data signal greater than common voltage) inversion driving period, the voltage of the second pixel electrode M2 is greater than the voltage of the capacitor element C1. When the fifth switch Q5 is conductive, the second pixel electrode M2 will transfer a part of charges to the capacitor element C1 so that the voltage of the second pixel electrode M2 is lowered, which results in the second pixel electrode M2 no longer having a voltage the same as the first pixel electrode M1 and the third pixel electrode M3 when the data line inputting the data signal. As a result, a non-zero voltage difference exists between the first pixel electrode M1 and the third pixel electrode M3 respectively. In the negative polarity (data signal less than common voltage) inversion driving period, the voltage of the second pixel electrode M2 is lower than the voltage of the capacitor element C1. When the fifth switch Q5 is conductive, the capacitor element C1 will transfer a part of charges to the second pixel electrode M2 so that the voltage of the second pixel electrode M2 is increased, which results in the second pixel electrode M2 no longer having a voltage the same as the first pixel electrode M1 and the third pixel electrode M3 when the data line inputting the data signal. As a result, a non-zero voltage difference exists between the first pixel electrode M1 and the third pixel electrode M3 respectively. Hence, regardless of in a positive polarity inversion driving period or a negative polarity inversion driving period, the conductivity of the fifth switch Q5 makes the voltage of the second pixel electrode M2 change through the capacitor element C1 so that the second pixel electrode M2 has a voltage different from the voltage of the first pixel electrode M1 and the third pixel electrode M3, which further leads to the deflection of liquid crystal molecules in the liquid crystal area corresponding to the second pixel electrode M2 different from the deflection of liquid crystal molecules in the liquid crystal areas corresponding to the first pixel electrode M1 and the third pixel electrode M3. As such, the color difference observed at large viewing angle in 2D display mode is reduced as well as the color distortion.

In 3D display mode, the common electrode 16 inputs a fixed voltage. The second scan line 12 corresponding to the pixel unit 15 inputs a high level (0V~33V) second scan signal to make the fourth switch Q4 conductive, such as, inputting a 10V high level scan signal to make the fourth switch Q4 conductive in 3D display mode. The first scan signal is inputted to the first scan line 11 corresponding to the pixel unit 15 to make the first pixel electrode M1, the second pixel electrode M2 and the third pixel electrode M3 conductive. The data line 14 corresponding to the pixel unit 15 provides data signal to the first pixel electrode M1, the second pixel electrode M2 and the third pixel electrode M3 through the three switches Q1, Q2, and Q3 respectively.

At this point, because the fourth switch is conductive, the first pixel electrode M1 and the common electrode 16 are electrically connected. Because of the positive/negative polarity inversion driving manner, charge transfer occurs during the electrical connection between the first pixel electrode M1 and the common electrode 16, and the voltage of the first pixel electrode M1 moves towards the voltage of the common electrode 16. Specifically, when the positive polarity inverses, the voltage of the first pixel electrode M1 is greater than the voltage of the common electrode 16 so that the first pixel electrode M1 transfers a part of charges to the common electrode 16 and the voltage of the first pixel electrode is lowered and finally reaches the voltage of the common electrode 16. As such, the first pixel electrode M1 and the common electrode 16 reach a state of charge balance. The voltage of the common electrode 16 remains the same and the charges transferred by the first pixel electrode M1 is released through the common electrode 16. When the negative polarity inverses, the voltage of the first pixel electrode M1 is lower than the voltage of the common electrode 16 so that the common electrode 16 transfers a part of charges to the first pixel electrode M1 and the voltage of the first pixel electrode is increased and finally reaches the voltage of the common electrode 16. As such, the first pixel electrode M1 and the common electrode 16 reach a state of charge balance. Through controlling the current flowing capability of the fourth switch Q4 in conductive period, the charge transfer speed between the first pixel electrode M1 and the common electrode 16 is controlled so that under the control of the fourth switch Q4, the first pixel electrode M1 and the common electrode 16 reach a state of charge balance during the conductive period of the fourth switch Q4. That is, the two have the same voltage. As a result, the zero voltage difference between the first pixel electrode M1 and the common electrode 16 leads to the first pixel electrode M1 in a state corresponding to displaying a black image. Therefore, when the data line 14 corresponding to the pixel unit 15 inputs data signal to the first pixel electrode M1, the second pixel electrode M2 and the third pixel electrode M3, under the effect of the conductivity of the fourth switch Q4, the voltage of the first pixel electrode M1 is the same as the voltage of the common electrode 16 so that the first pixel electrode M1 is in a state corresponding to displaying a black image, while the second pixel electrode M2 and the third pixel electrode M3 are both in state corresponding to displaying a 3D image.

Then, the first scan line 11 stops inputting the first scan signal so that the first switch Q1, the second switch Q2 and the third switch Q3 become non-conductive. The third scan line 13 corresponding to the pixel unit 15 inputs the third scan signal to make the fifth switch Q5 conductive so that the second pixel electrode M2 and the capacitor element C1 are electrically connected. The voltage of the second pixel electrode M2 increases or lowers through the capacitor element C1 so that the voltage of the second pixel electrode M2 changes, which results in the voltage of the second pixel electrode M2 different from the voltage of the third pixel electrode M3. In other words, a non-zero voltage difference exists between the second pixel electrode M2 and the third pixel electrode M3, which reduces the color difference observed at large viewing angle in 3D display mode as well as the color distortion. The specific theory and process can be referred to the aforementioned 2D display mode, and the repetition is omitted here.

In addition, in the instant embodiment, the first pixel electrode M1, the second pixel electrode M2 and the third pixel electrode M3 are disposed in sequence along the row direction, and the two neighboring columns of pixel units 15 correspond to the left-eye image and the right-eye image of a 3D image. In 3D display mode, the fourth switch Q4 affects on the first pixel electrode M1 to make the first pixel electrode M1 in a state corresponding to displaying a black image, equivalent to a black matrix (BM), so that the a BM exists between the pixel electrodes displaying the left-eye image (the second pixel electrodes and the third pixel electrodes of one column of pixel units) and the pixel electrodes displaying the right-eye image (the second pixel electrodes and the third pixel electrodes of the other column of pixel units) in the two neighboring columns of pixel units. Through the BM stopping the signal cross-talk between the left-eye image and the right-eye image, the cross-talk of two images of two eyes is reduced.

Obviously, in other embodiments, the three pixel electrodes can also be arranged along the column direction. In those embodiments, the two neighboring rows of pixel units are in a state corresponding to displaying the left-eye image and the right-eye image of a 3D image, respectively. Through the first pixel electrode in a state corresponding to displaying a black image, the cross-talk of two images of two eyes in 3D display mode is reduced.

As such, under the effect of the first control circuit 151 and the second control circuit 152, the array substrate of the instant embodiment can improve the opening ratio in 2D display mode and reduce the signal cross-talk in 3D display mode as well as reduce the color difference at large viewing angle in both display modes and increase the viewing angle. In addition, compared to the known technique, the instant embodiment only requires a data line 14 to drive a corresponding pixel unit 15, and thus, the number of data lines is reduced, resulting in reduction of the number of data driving chips. For example, when a known technique requires n data driving chips, the array substrate of the present invention only requires n/2 data driving chips. Although the instant embodiment uses an additional second scan line 12, and correspondingly increases the number of scan driving chips, the scan driving chip is cheaper than the data driving chip and the manufacturing cost can be effectively lowered. Furthermore, in the array substrate of the instant embodiment, all of the second scan lines 12 are electrically connected in the peripheral area of the array substrate. Therefore, only a scan driving chip is sufficient to drive the second scan lines 12, which further reduces the cost.

In addition, in other embodiments, the first control circuit can be connected to a reference voltage source with constant voltage output, instead of connected to the common electrode. The constant voltage output of the reference voltage source is the same as the common voltage. At this point, the first terminal of the fourth switch Q4 is connected to the first pixel electrode, the second terminal is connected to the reference voltage source. When the second scan line makes the fourth switch conductive, the charge transfers between the first pixel electrode and the reference voltage source so that the voltage of the first pixel electrode is the same as the voltage of the reference voltage source, which results in a zero voltage difference between the first pixel electrode and the common electrode to make the first pixel electrode in a state corresponding to displaying a black image.

In other embodiments, the first control circuit can also control the data signal of the first pixel electrode completely released when the second scan line inputs the second scan signal so that the first pixel electrode does not have any data signal for displaying, resulting in the first pixel electrode in a state corresponding to displaying a black image. For example, the first control circuit can be grounded. The first control circuit can also control the first pixel electrode grounded when the second scan line inputs the second scan signal so that the first pixel electrode discharges through the ground, resulting in the first pixel electrode in a state corresponding to displaying a black image.

In addition, the second control circuit can further comprise a controlled switch and a voltage divider. The second pixel electrode is connected to one end of the voltage divider through the controlled switch and the other end of the voltage divider is grounded. When the third scan line makes the controlled switch conductive, the voltage of the second pixel electrode is lowered through the voltage divider. As such, the voltage of the second pixel electrode can be changed.

Figure 6:
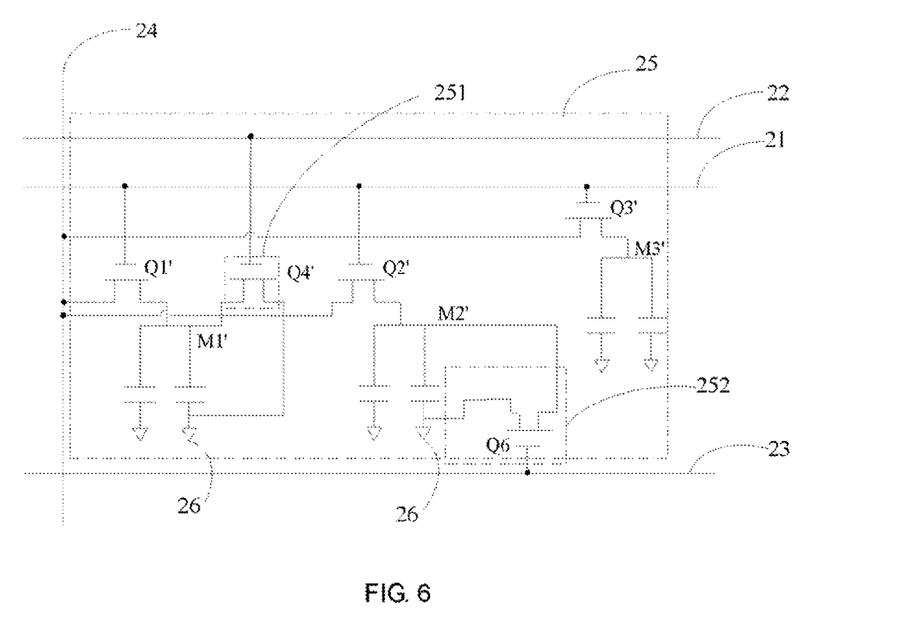
FIG. 6 is a schematic view showing an equivalent circuit diagram of a pixel unit in another embodiment of the array substrate according to the present invention.

Referring to FIG. 6, in another embodiment of array substrate of the present invention, the second control circuit 252 of the array substrate comprises a sixth switch Q6. The control terminal of the sixth switch Q6 is connected to the third scan line 23, the first terminal of the sixth switch Q6 is connected to the second pixel electrode M2', the second terminal of the sixth switch Q6 is connected to the common electrode 26. The remaining part of the array substrate is the same as the structure of FIG. 5, and the detailed description will be omitted. The sixth switch Q6 is a thin-film transistor (TFT), and the control terminal corresponds to the gate of the TFT, the input terminal corresponds to the source of the TFT and the output terminal corresponds to the drain of the TFT. The sixth switch Q6 of the instant embodiment can also make the second pixel electrode M2' change during the conductive period.

Specifically, when the third scan line 23 controls the sixth switch Q6 to be conductive, the second pixel electrode M2' and the common electrode 26 are electrically connected. Because of the positive/negative polarity inversion driving manner, charge transfers occur during the electrical connection of the second pixel electrode M2' and the common electrode 26, which leads to the change of the voltage of the second pixel electrode M2'. Under the control of the sixth switch Q6, the second pixel electrode M2' and the common electrode 26 will not reach a state of charge balance during the conductive period of the sixth switch Q6. In other words, during the positive polarity inverse driving, the voltage of the second pixel electrode M2' will be lowered, but not lowered to the voltage of the common electrode 26; and during the negative polarity inverse driving, the voltage of the second pixel electrode M2' will be increased, but not increased to the voltage of the common electrode 26. In actual application, through controlling the current flowing capability in the conductive period of the sixth switch Q6, the charge transfer speed between the second pixel electrode M2' and the common electrode 26 can be controlled to achieve that a non-zero voltage difference exists between the second pixel electrode M2' and the common electrode 26 during the conductive period of the sixth switch Q6. For example, by designing the width/length ratio of the trench of the sixth switch Q6, the current flowing capability in the conductive period of the sixth switch Q6 is controlled. The lower the width/length ratio of the trench is, the smaller the current flowing capability in the conductive period of the sixth switch Q6 will be; and the higher the width/length ratio of the trench is, the greater the current flowing capability in the conductive period of the sixth switch Q6 will be. A suitable width/length ratio can be selected according to the actual application. Alternatively, the current flowing capability in the conductive period of the sixth switch Q6 can also be controlled by controlling the scan signal inputted to the third scan line 23. No specific restriction is imposed here.

Through the second control circuit 252 of the instant embodiment, the voltage of the second pixel electrode M2' can also be changed so that the voltage of the second pixel electrode M2' is different from the voltages of the first pixel electrode M1' and the third pixel electrode M3' so as to achieve the effect of reducing the color difference at large viewing angle. Compared to the embodiment of FIG. 5, FIG. 5 uses the capacitor element c1 to change the voltage of the second pixel electrode M2, and the fifth switch Q5 can be realized by regular transistor, and the instant embodiment uses the sixth switch Q6 to achieve the above object. At this point, the sixth switch Q6 must be specifically designed, such as, controlling the current flow capability during the conductive period to ensure the voltage of the second pixel electrode M2' will reach the voltage of the common electrode 26 during the conductive period. The actual second control circuit can be designed according to application.

In addition, in other embodiments, the sixth switch can also be a triode or a Darlington transistor.

Figure 7:
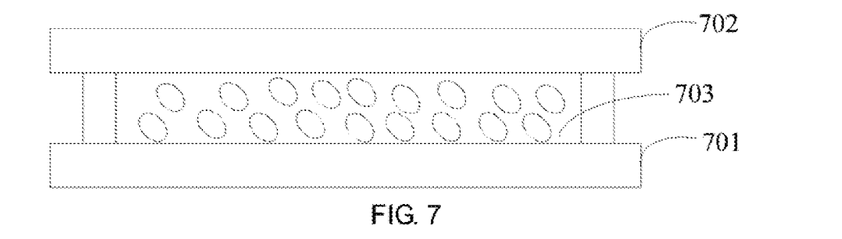
FIG. 7 is a side view showing the structure of an embodiment of a liquid crystal display panel according to the present invention.

Referring to FIG. 7, in an embodiment of a liquid crystal display panel, the liquid crystal display panel comprises an array substrate 701, a color filter substrate 702 and a liquid crystal layer 703 sandwiched between the array substrate 701 and the color filter substrate 702, wherein the array substrate is the array substrate shown in FIG. 3. In addition, the liquid crystal display panel of the instant embodiment further comprises: a plurality of first scan line drivers 704, a second scan line driver 705, a plurality of third scan line drivers 706, and a plurality of data line drivers 707. In other embodiments, the array substrate 701 can also be an array substrate of any of the above embodiments.

Figure 8:
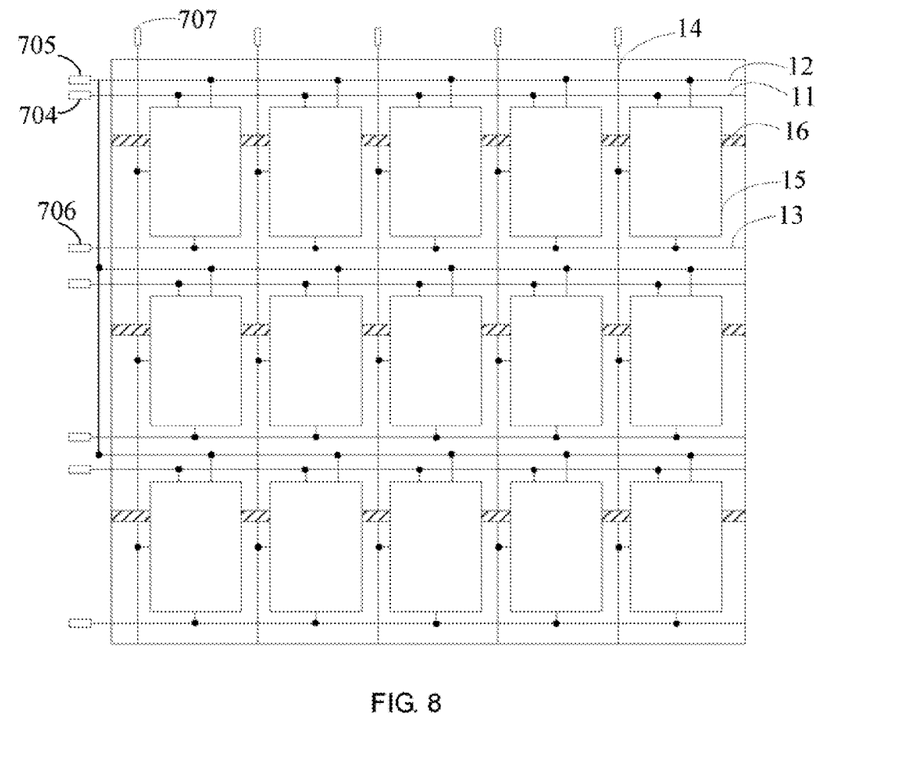
FIG. 8 is a top view showing the structure of an embodiment of a liquid crystal display panel according to the present invention, wherein only the array substrate and drivers of the liquid crystal display panel are shown.

Referring to FIG. 8, FIG. 8 is a top view showing the structure of the liquid crystal display panel of FIG. 7. All of the second scan lines 12 are electrically connected in the peripheral area of the array substrate 701, wherein each first scan line driver 704 is connected to a first scan line 11 to input a first scan signal to the first scan line 11; the second scan line driver 705 is connected to all second scan lines 12 to input a second scan signal and a fourth scan signal to the second scan lines 12; each third scan line driver 706 is connected to a third scan line 13 to input a third scan signal to the third scan line 13; and each data line driver 707 is connected to a data line 14 to input a data signal to the data line 14. The first scan line driver 704, the second scan line driver 705, the third scan line driver 706, and the data line driver 707 drive the liquid crystal display panel. The first scan line driver 704, the second scan line driver 705, and the third scan line driver 706 can be realized by scan line driving chip or by a scan driving circuit comprised of separate components. Similarly, the data line driver can be realized by data line driving chip or by a data driving circuit comprised of separate components. Compared to the known technique, the liquid crystal display panel of the present invention can improve the opening ratio in 2D display mode, as well as, reduce signal cross-talk in 3D display mode, reduce the color difference at large viewing angle in both display modes, increase viewing angle and reduce the number of the data line drivers to reduce the cost.

In addition, in other embodiments, all of the second scan lines can be mutually independent. In this case, the liquid crystal display panel must comprise a plurality of second scan line drivers so that each scan line driver is connected to a second scan line respectively.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate, which comprises: a plurality of first scan lines, a plurality of second scan lines, a plurality of third scan lines, a plurality of data lines, a plurality of pixel units, arranged in matrix form, and a common electrode for inputting a common voltage;

wherein the each pixel unit corresponding to a first scan line, a second scan line, a third scan line and a data line; each pixel unit further comprising a first pixel electrode, a second pixel electrode, a third pixel electrode, and a first switch, a second switch and a third switch controlling the first pixel electrode, the second pixel electrode and the third pixel electrode respectively; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal; the first control circuit being connected to the common electrode; the first control circuit affecting the first pixel electrode of the pixel unit when the second scan line corresponding to the pixel unit inputting a second scan signal so that a zero voltage difference existing between the first pixel electrode and the common electrode to make the first pixel electrode in a state corresponding to displaying a black image; the second circuit being connected to the common electrode; the second control circuit affecting the second pixel electrode of the pixel unit when the third scan line corresponding to the pixel unit inputting a third scan signal to change the voltage of the second pixel electrode;

wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode wherein the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

2. The array substrate as claimed in claim 1, wherein:
the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

3. The array substrate as claimed in claim 1, wherein:
the capacitor element is formed by a metal line forming the first scan line and a metal line forming the data line.

4. The array substrate as claimed in claim 1, wherein:
the second control circuit comprises a sixth switch, and the sixth switch comprises: a control terminal, a first terminal and a second terminal; the control terminal of the sixth switch is connected to the third scan line corresponding to the pixel unit, the first terminal of the sixth switch is connected to the second pixel electrode of the pixel unit, the second terminal of the sixth switch is connected to the common electrode; when the third scan line corresponding to the pixel unit inputs the third scan signal, the sixth switch is conductive; during the conductive period, the sixth switch changes the voltage of the second pixel electrode.

5. The array substrate as claimed in claim 1, wherein:
all of the second scan lines are electrically connected in the peripheral area of the array substrate.

6. An array substrate, which comprises: a plurality of first scan lines, a plurality of second scan lines, a plurality of third scan lines, a plurality of data lines, a plurality of pixel units, arranged in matrix form, and a common electrode for inputting a common voltage; wherein the each pixel unit corresponding to a first scan line, a second scan line, a third scan line and a data line;

each pixel unit further comprising a first pixel electrode, a second pixel electrode, a third pixel electrode, and a first switch, a second switch and a third switch controlling the first pixel electrode, the second pixel electrode and the third pixel electrode respectively; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal;

the first control circuit affecting the first pixel electrode of the pixel unit when the second scan line corresponding to the pixel unit inputting a second scan signal to make the first pixel electrode in a state corresponding to displaying a black image; the second control circuit affecting the second pixel electrode of the pixel unit when the third scan line corresponding to the pixel unit inputting a third scan signal to change the voltage of the second pixel electrode;

wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode;

wherein the second circuit is connected to the common electrode; the second control circuit affects the second pixel electrode of the pixel unit when the third scan line corresponding to the pixel unit inputs the third scan signal to change the voltage of the second pixel electrode;

wherein the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

7. The array substrate as claimed in claim 6, wherein:
the first control circuit is connected to the common electrode; the first control circuit affects the first pixel electrode of the pixel unit when the second scan line corresponding to the pixel unit inputs a second scan signal so that a zero voltage difference exists between the first pixel electrode and the common electrode to make the first pixel electrode in a state corresponding to displaying a black image.

8. The array substrate as claimed in claim 7, wherein:
the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

9. The array substrate as claimed in claim 6, wherein:
the capacitor element is formed by a metal line forming the first scan line and a metal line forming the data line.

10. The array substrate as claimed in claim 6, wherein:
the second control circuit comprises a sixth switch, and the sixth switch comprises: a control terminal, a first terminal and a second terminal; the control terminal of the sixth switch is connected to the third scan line corresponding to the pixel unit, the first terminal of the sixth switch is connected to the second pixel electrode of the pixel unit, the second terminal of the sixth switch is connected to the common electrode; when the third scan line corresponding to the pixel unit inputs the third scan signal, the sixth switch is conductive; during the conductive period, the sixth switch changes the voltage of the second pixel electrode.

11. The array substrate as claimed in claim 6, wherein:
all of the second scan lines are electrically connected in the peripheral area of the array substrate.

12. A liquid crystal display panel, which comprises a plurality of first scan line drivers, at least a second scan line driver, a plurality of third scan line drivers, a plurality of data line drivers, an array substrate, a color filter substrate, and a liquid crystal layer sandwiched between the array substrate and the color filter substrate;

wherein the array substrate comprising: a plurality of first scan lines, a plurality of second scan lines, a plurality of third scan lines, a plurality of data lines, a plurality of pixel units, arranged in matrix form, and a common electrode for inputting a common voltage; wherein the each pixel unit corresponding to a first scan line, a second scan line, a third scan line and a data line;

each first scan line driver being connected to a first scan line to input a first scan signal to the first scan line; each of the at least a second scan line driver being connected to all second scan lines to input a second scan signal and a fourth scan signal to the second scan lines; each third scan line driver being connected to a third scan line to input a third scan signal to the third scan line; and each data line driver being connected to a data line to input a data signal to the data line;

each pixel unit further comprising a first pixel electrode, a second pixel electrode, a third pixel electrode, and a first switch, a second switch and a third switch controlling the first pixel electrode, the second pixel electrode and the third pixel electrode respectively; each pixel unit further comprising a first control circuit and a second control circuit; the data line corresponding to the pixel unit being connected through the first switch, the second switch and the third switch to the first pixel electrode, the second pixel electrode and the third pixel electrode respectively for providing data signal; the first switch, the second switch and the third switch being conductive when the first scan line corresponding to the pixel unit inputting a first scan signal;

the first control circuit affecting the first pixel electrode of the pixel unit when the second scan line corresponding to the pixel unit inputting a second scan signal to make the first pixel electrode in a state corresponding to displaying a black image; the second control circuit affecting the second pixel electrode of the pixel unit when the third scan line corresponding to the pixel unit inputting a third scan signal to change the voltage of the second pixel electrode;

wherein in 2D display mode, the first pixel electrode, the second pixel electrode and the third pixel electrode being in a state corresponding to displaying a 2D image under the effect of first scan line and the data line corresponding to the pixel unit; the first control circuit controlling the first pixel electrode of the pixel unit to be in a state corresponding to displaying a 2D image when the second scan line corresponding to the pixel unit inputting the fourth scan signal, then the third scan line corresponding to the pixel unit inputting the third scan signal to control the second control circuit to affect the second pixel electrode of the second pixel unit, the voltage of the second pixel electrode changing under the effect of the second control circuit so that the second pixel electrode of the pixel unit having respective non-zero voltage difference with the first pixel electrode and the third pixel electrode; in 3D display mode, the second scan line corresponding to the pixel unit inputting the second scan signal to control the first control circuit to affect the first pixel electrode, the second pixel electrode and the third pixel electrode of the pixel unit to be in a state corresponding to displaying a 3D image under the effect of the first scan line and the data line corresponding to the pixel unit; the first pixel electrode being in a state corresponding to displaying a black image under the effect of the first control circuit, then the third scan line corresponding to the pixel unit inputting the third scan signal to control the second control circuit to affect the second pixel electrode of the pixel unit, the voltage of the second pixel electrode changing under the effect of the second control circuit so that the second pixel electrode of the pixel unit having a non-zero voltage difference with the third pixel electrode;

wherein the second circuit is connected to the common electrode; the second control circuit affects the second pixel electrode of the pixel unit when the third scan line corresponding to the pixel unit inputs the third scan signal to change the voltage of the second pixel electrode;

wherein the second control circuit comprises a fifth switch and a capacitor element, and the fifth switch comprises: a control terminal, a first terminal and a second terminal; the control terminal of the fifth switch is connected to the third scan line corresponding to the pixel unit, the first terminal of the fifth switch is connected to the second pixel electrode of the pixel unit, the second terminal of the fifth switch is connected to one end of the capacitor element and the other end of the capacitor element is connected to the common electrode; when the third scan line corresponding to the pixel unit inputs the third scan signal, the fifth switch is conductive so that the second pixel electrode of the pixel unit and the capacitor element are electrically connected; the voltage of the second pixel electrode changes through the capacitor element.

13. The liquid crystal display panel as claimed in claim 12, wherein:

the first control circuit is connected to the common electrode; the first control circuit affects the first pixel electrode of the pixel unit when the second scan line corresponding to the pixel unit inputs a second scan signal so that a zero voltage difference exists between the first pixel electrode and the common electrode to make the first pixel electrode in a state corresponding to displaying a black image.

14. The liquid crystal display panel as claimed in claim 13, wherein:

the first control circuit comprises a fourth switch, and the fourth switch comprises: a control terminal, a first terminal and a second terminal; the control terminal of the fourth switch is connected to the second scan line corresponding to the pixel unit, the first terminal of the fourth switch is connected to the first pixel electrode of the pixel unit, the second terminal of the fourth switch is connected to the common electrode; when the second scan line corresponding to the pixel unit inputs the second scan signal, the fourth switch is conductive so that the first pixel electrode of the pixel unit and the common electrode are electrically connected; during the conductive period, the fourth switch controls the first pixel electrode to have a zero voltage difference with the common electrode.

15. The liquid crystal display panel as claimed in claim 12, wherein:

all of the second scan lines are electrically connected in the peripheral area of the array substrate.

* * * * *